United States Patent [19]

Folmsbee

[11] Patent Number: 5,386,151
[45] Date of Patent: Jan. 31, 1995

[54] LOW VOLTAGE CHARGE PUMPS USING P-WELL DRIVEN MOS CAPACITORS

[75] Inventor: Alan C. Folmsbee, Santa Clara, Calif.

[73] Assignee: Advanced Micro Devices, Inc., Sunnyvale, Calif.

[21] Appl. No.: 105,825

[22] Filed: Aug. 11, 1993

[51] Int. Cl.[6] .......................... H03K 3/01; H03K 19/01
[52] U.S. Cl. .................................. 327/536; 327/390; 327/534; 327/589
[58] Field of Search ................ 307/296.2, 296.8, 578, 307/482, 264; 365/226

[56] References Cited

U.S. PATENT DOCUMENTS

| | | | |
|---|---|---|---|
| 3,983,414 | 9/1976 | Stafford et al. | 307/578 |
| 5,008,799 | 4/1991 | Montalvo. | |
| 5,059,815 | 10/1991 | Bill et al. | |
| 5,075,571 | 12/1991 | Dhong et al. | 307/296.2 |
| 5,172,013 | 12/1992 | Matsumura | 307/296.2 |

OTHER PUBLICATIONS

IEEE Journal of Solid State Circuits vol. SC.11, No. 3, Jun. 1976 (attached) pp. 374–378, Dickson, "On Chip High Voltage Generation in MNOS Integrated Circuits Using An Improved Voltage Multiplier Technique".

Primary Examiner—Timothy P. Callahan
Assistant Examiner—Toan Tran
Attorney, Agent, or Firm—Raymond Kam-On Kwong; Joseph Sawyer, Jr.

[57] ABSTRACT

A low voltage charge pump operable with a low voltage power supply and a clock signal is provided for delivering a final output voltage which is higher than the supply voltage. The low voltage charge pump comprises MOS capacitors formed of MOS devices, each capacitor including a p-well acting as a plate of the respective capacitor. Through this arrangement, the effective area of the capacitor is increased resulting in an increase in capacitance. Therefore, a more efficient charge pumping effect is provided in a low voltage power supply such as 3.3 volts. The p-well of each of the capacitor is driven from ground voltage to one threshold voltage less than the supply voltage to minimize forward bias of the p-wells and the n-type substrates of the MOS devices.

14 Claims, 2 Drawing Sheets

LOW VOLTAGE CHARGE PUMPS USING P-WELL DRIVEN MOS CAPACITORS

FIELD OF THE INVENTION

This invention relates to charge pumps, and in particular, to charge pumps in low voltage integrated circuit technology.

BACKGROUND OF THE INVENTION

Metal oxide semiconductor (MOS) devices are well known. Field effect transistors (FET) MOS devices are also well known and are generally referred to as MOSFETs. For example, a n-channel MOSFET consists of a lightly doped p-well formed on a n-type substrate. Two highly doped n+ regions are diffused. One of the n+ regions is connected to a conductor and is referred to as a source (S). The other of the n+ regions is connected to another conductor and is referred to as a drain (D). Between the source and the drain, another conductor is positioned which is known as the gate (G). The source and the drain are diffused into the silicon and the gate sits atop an insulating layer, generally a silicon dioxide layer. In essence, the gate is charged so as to induce a n-channel between the two separated n+ regions of the MOSFET. This will produce an enhancement type MOS device. P-channel MOSFETs can similarly be constructed.

Charge pumps are circuit elements using the pumping action of diode connected MOSFETs and MOS capacitors to provide a voltage source of higher voltage than the power supplies. A diode connected MOSFET (known also as a MOSFET diode or a MOS transistor diode) is a MOS transistor with its gate and drain terminals shorted to each other. By applying an oscillating voltage to the tied source and drain terminals of the MOS capacitor, a successively higher voltage is induced at the source terminal of the MOS transistor diode with time, until a steady state voltage is reached.

The charge pumping effect may be achieved by a MOS capacitor, which is a MOSFET with its source and drain terminals shorted to each other, and with its gate terminal connected to a MOS transistor diode and its p-wells connected to ground voltage. In this case, the gate conductor forms one plate of the capacitor. As it is well known, MOS devices have three basic states of operation: inversion, depletion and accumulation. In case of a n-channel MOS device, inversion occurs when the voltage VGS between G and S is greater than a certain threshold voltage, $V_T$ which is characterized by the design and fabrication process of the device. When inversion occurs, a n-channel connecting the source and drain region is induced at the top of the p-well underneath the gate. The effective capacitance of the MOS capacitor is that of the source-drain to gate capacitance in parallel with the n-channel to gate capacitance, which is equal to the sum of the two capacitors. Depletion or accumulation occurs when $V_{GS}$ is less than $V_T$. When depletion or accumulation occurs, no channel is induced. The effective capacitance of the MOS capacitor is that of the source-drain to gate capacitance alone, which is significantly less than the effective capacitance when the MOS capacitor is in the inversion state. Typically, prior charge pumps are used to provide a voltage source substantially higher than the power supply voltage (VDD) which is normally at 5.0 volts, with a tolerance of +/−0.5 volts. With a 5.0 volts power supply voltage, the MOS capacitor can be driven into inversion state easily and accordingly, sufficient effective capacitance is provided for charge pumping action.

Presently, however, electronic technology is heading toward reducing the power consumption of integrated circuit chip, and thus a reduced VDD, which is typically 3.3 volts with a tolerance +/−0.3 volts, is becoming more popular. In such a situation, the prior art charge pump mechanism is limited. When the power supply voltage is at 3.3 volts, the effective capacitance obtainable with an MOS capacitor is drastically reduced as previously explained because $V_{GS}$ is now closer to the $V_T$ of the MOS transistor. Instead of maintaining the MOS capacitor at inversion state, the MOS capacitor may remain at either depletion or accumulation state which results in a significant reduction of its effective capacitance. As the capacitance goes down, the output voltage will be reduced accordingly. Thus the prior art charge pump is not able to provide the output voltage at the desired level. There have been attempts made in the prior art to relieve the problem by replacing MOS capacitor with a double polysilicon capacitor structure, where each polysilicon structure forms the respective plate of the capacitor. While a double polysilicon capacitor can provide the desired capacitance when the supply voltage is at a lower voltage, the additional steps associated with forming double polysilicon capacitor structures complicate the wafer fabrication process and increase the cost of manufacturing.

Accordingly, it would be desirable to provide an improved charge pump which can operate under low voltage power supply condition without increasing its complexity. It is also desirable to provide an improved charge pump which can operate without signifcantly increasing the cost of the manufacturing process. The present invention addresses such a need.

SUMMARY OF THE INVENTION

Accordingly, it is a general aspect of the present invention to provide an improved low voltage charge pump which is relatively simple and economical to design and manufacture, but yet overcomes the disadvantages of the prior art charge pump.

It is also an aspect of the present invention to provide an improved low voltage charge pump which operate properly with a low voltage power supply to provide high voltage output.

It is another aspect of the present invention to provide an improved low voltage charge pump which includes MOS capacitors formed of MOS devices, each of the capacitor including a p-well acting as a plate of the respective capacitor, thereby increasing the effective area of the capacitor so formed, resulting in an increase in capacitance and a more efficient charge pumping effect without relying on the capacitors being in the inversion state, thus allowing the charge pump to operate with a low voltage power supply.

It is yet another aspect of the present invention to provide a low voltage charge pump which includes MOS capacitors formed of MOS devices, whereby the p-well of each of the capacitor is driven from a lower supply voltage to one threshold voltage less than the upper supply voltage for avoiding possible degradation of the MOS devices and circuits coupled to them due to forward biasing of the p-wells and the n-type substrates of the MOS devices.

It is still another aspect of the present invention to provide a low voltage charge pump which is responsive to an upper supply voltage input VDD to provide a final output voltage that is at $VDD+V_T$ when the clock signal is functioning properly and at $VDD-V_T$ when the clock signal stops due to an error.

In accordance with these aims and aspects, the present invention is concerned with the provision of an improved low voltage charge pump which operates with a low voltage power supply and delivers a higher voltage. The low voltage charge pump is designed for receiving a clock signal, a first supply voltage and a second supply voltage and for generating a final output voltage. The low voltage charge pump includes a voltage generating means for generating a voltage which is at a first predetermined voltage above the first supply voltage and a timing signals means for providing timing signals to the voltage generating means.

The low voltage charge pump of the present invention includes MOS capacitors formed of MOS devices, each of the capacitor including a p-well acting as a plate of the respective capacitor, thereby increasing the effective area of the MOS capacitor so formed, resulting in an increase in capacitance and a more efficient charge pumping effect without relying on the capacitors being in the inversion state, thus allowing the charge pump to operate with a low voltage power supply. Furthermore, the p-well of each of the capacitor is driven from a lower supply voltage to one threshold voltage less than an upper supply voltage for avoiding possible degradation of the MOS devices and circuits coupled to them due to forward biasing of the p-wells and the n-type substrates of the MOS devices. In the preferred embodiment, the low voltage charge pump is able to deliver an output voltage in the range of $VDD-V_T$ to $VDD+V_T$ and with low noise level, and in the case the user accidentally put a 3.3 volts device into a 5.0 volts power supply, the charge pump limits the maximum voltage in the pump circuit to 7.0 volts.

BRIEF DESCRIPTION OF THE DRAWINGS

These and other aspects and advantages of the present invention will become more fully apparent from the following detailed description when read in conjunction with the accompanying drawings with like references numerals indicating corresponding parts throughout, wherein.

DESCRIPTION OF THE PREFERRED EMBODIMENT

The present invention relates to a low voltage charge pump which operates properly with a low voltage power supply to provide a high voltage output. The following description is presented to enable one of ordinary skill in the art to make and use the invention and is provided in the context of a patent application and its requirements. Various modifications to the preferred embodiment will be readily apparent to those skilled in the art. Accordingly, the present invention should only be limited by the generic principles and features described herein.

Figure 1A:
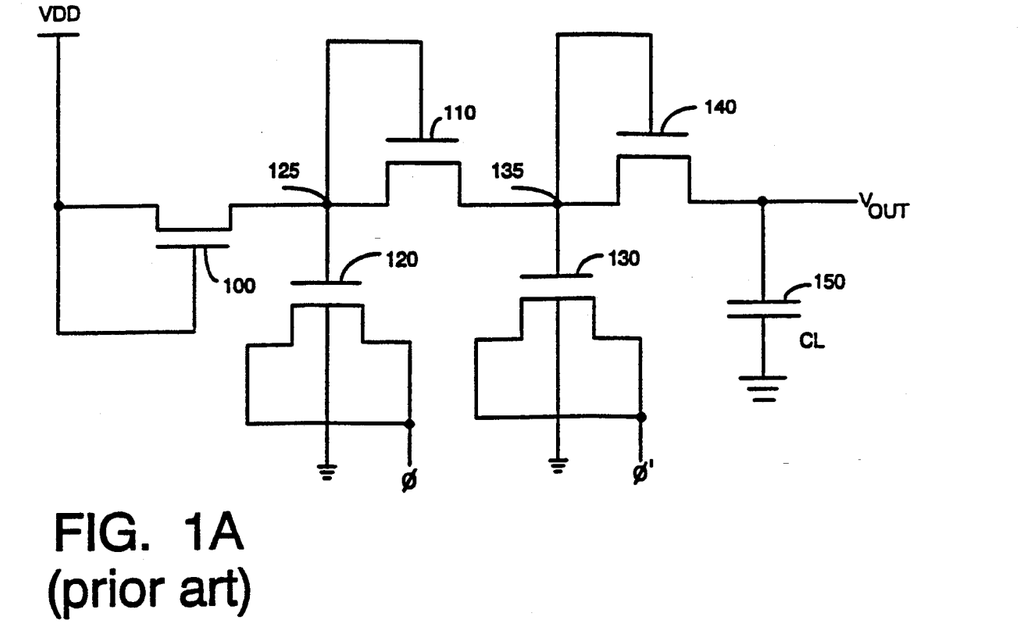
FIG. 1A shows a prior art charge pump circuit using two MOS capacitors and three MOSFET diodes.

FIG. 1A shows a two-stage charge pump circuit in the prior art. As shown in FIG. 1A, and throughout the following description, MOS capacitors (e.g. capacitors 120 and 130) are shown to be N-MOSFETs. The use of a N-MOSFET in this description is for the purpose of example only. One of ordinary skill in the art will readily recognize from the following description and the accompanying drawings that corresponding circuits could utilize P-MOSFETs.

In FIG. 1A, the source-drain terminal of MOS capacitor 120 is connected to clock input $\phi$, the gate terminal of MOS capacitor 120 is connected to node 125, which is connected to the gate and drain terminals of NMOS transistor 110, and the source terminal of NMOS transistor 100. The drain terminal of NMOS transistor 100 is connected to a supply voltage VDD. The source terminal of NMOS transistor 110 is connected to node 135, which is the gate terminal of MOS capacitor 130. The gate and drain terminals of NMOS transistor 140 are also connected to node 135.

Figure 1B:
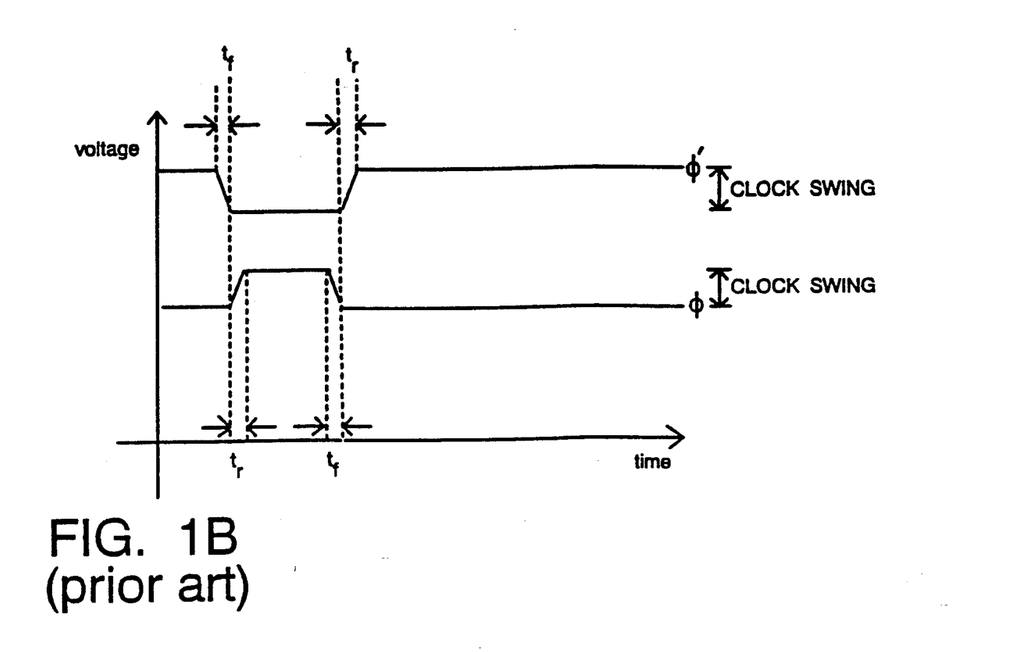
FIG. 1B shows the complementary clock inputs $\phi$ and $\phi'$ used in the charge pump circuit of FIG. 1A.

The MOS capacitor 130 is driven at its source drain terminal by clock input $\phi'$, which is the non-overlapping complementary signal to clock signal $\phi$ (see FIG. 1B). MOS capacitor has its p-well grounded. MOS capacitor 120 and MOS transistor diode 110 form the first stage of this charge pump circuit. MOS capacitor 130 and MOS transistor diode 140 form the second, and, in this implementation, the output stage of the charge pump circuit. The source terminal of NMOS transistor 140 is tapped as the output terminal $V_{out}$ of this charge pump circuit. Initially, through NMOS transistor 100, node 125 is precharged to within the supply voltage VDD less the $V_T$ of NMOS transistor 100.

FIG. 1B shows the non-overlapping and complementary waveforms of clock inputs $\phi$ and $\phi'$. When clock input $\phi$ is low, MOS capacitor 120 is on, i.e. in the inversion state. As clock input $\phi$ goes high, node 125 is capacitively coupled to a voltage equal its precharge voltage plus the clock swing of clock input $\phi$, with some loss due to the parasitic capacitance at node 125. This turns on MOS transistor diode 110 which charges up node 135. When clock input $\phi$ goes low, node 125 follows, thus turning off transistor 110. Immediately thereafter, clock input $\phi'$ goes high which increases the voltage at node 135 by the voltage swing of clock input $\phi'$ times a capacitive coupling ratio. The charging of node 135 turns on MOSFET 140 which charges up $V_{out}$.

Node 125 is precharged to a higher voltage with each successive clock cycle. The maximum output voltage $V_{out}$ of a stage in the pump is equal to the maximum precharge voltage VDD plus the clock voltage $V_\phi$ times the coupling ratio K less the $V_T$ of the MOS transistor diode.

As explained earlier, while the prior art charge pump is capable of providing an output voltage higher than the supply voltage when the supply voltage is at higher voltages (i.e. 5.0 volts), it has the drawback of not being able to provide higher voltage output when operating with a low voltage power supply, such as 3.0 volts because capacitance of the MOS capacitors is significantly reduced at these voltages. The present invention addresses the identified drawback seen in the prior art charge pump.

Figure 2:
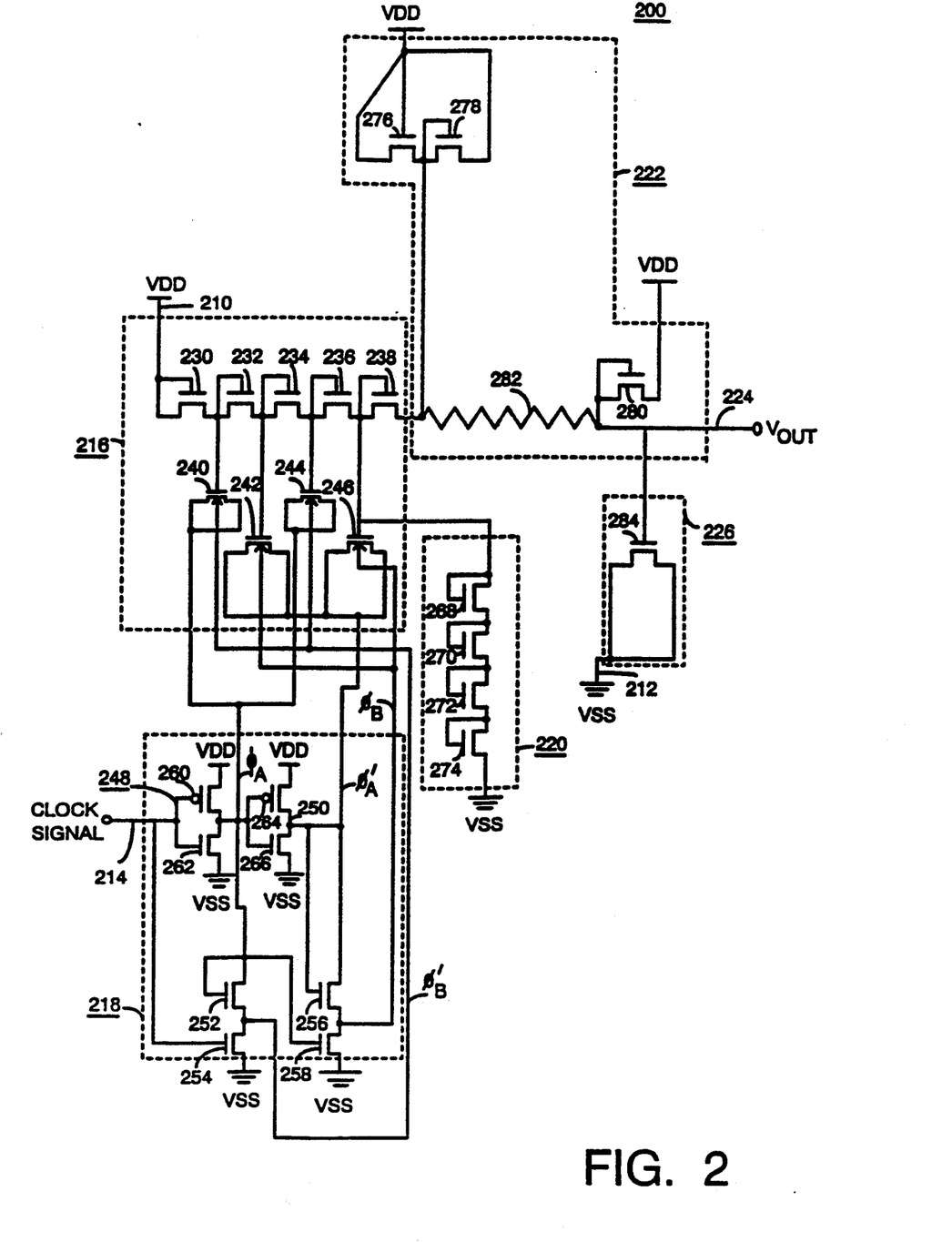
FIG. 2 is a detailed schematic circuit diagram of a low voltage charge pump constructed in accordance with the principles of the present invention.

Referring now to FIG. 2 of the drawings, there is shown a detailed schematic circuit diagram of a low voltage charge pump 200 constructed in accordance with the principles of the present invention. The low voltage charge pump includes a first terminal 210, a second terminal 212, a third terminal 214, a voltage generating circuit 216, a timing signal circuit 218, a voltage limiter circuit 220, a voltage regulator circuit 222, a fourth terminal 224, also known as final output terminal, and a filtering circuit 226. The first terminal 210 is for receiving the upper supply voltage VDD, which is typically at 3.3 +/−0.3 volts and the second terminal 212 is for receiving the lower supply voltage VSS which is typically at 0 volt. The third terminal 214 is for receiving a clock signal $\phi_o$. The fourth terminal 224 is the output terminal for the final output voltage $V_{out}$.

The voltage generating circuit 216 includes a first MOS transistor diode 230, a second MOS transistor diode 232, a third MOS transistor diode 234, a fourth MOS transistor diode 236, a fifth MOS transistor diode 238, a first NMOS capacitor 240, a second NMOS capacitor 242, a third NMOS capacitor 244 and fourth NMOS capacitor 246.

The first MOS transistor diode 230 has its drain coupled to its gate and its gate coupled to the first terminal 210. The second MOS transistor diode 232 has its drain coupled to its gate and its gate coupled to the source of the first MOS transistor diode 230. The third MOS transistor diode 234 has its drain coupled to its gate and its gate coupled to the source of the second MOS voltage transistor diode 232. The fourth MOS transistor diode 236 has its drain coupled to its gate, its gate coupled to the source of the third MOS transistor diode 234 and its source coupled to the drain of the fifth MOS transistor diode 238. MOS transistor diodes 230, 232, 234, 236, and 238 provide the function of 5 diodes in series. These diode-connected transistors will hold the output voltage from the earlier pumped stages without backflow.

The first NMOS capacitor 240 has a p-type well and has its gate coupled to the source of the first MOS transistor diode 230 and its source coupled to its drain. The second NMOS capacitor 242 has a p-type well and has its gate coupled to the source of the second MOS transistor diode 232 and its source coupled to its drain. The third NMOS capacitor 244 has a p-type well and has its gate coupled to the source of the third MOS transistor diode 234 and its source coupled to its drain. The fourth NMOS capacitor 246 has a p-type well and has its gate coupled to the source of the fourth MOS transistor diode 236 and its source coupled to its drain.

The timing signal circuit 218 comprises a first inverter 248, a second inverter 250, a first MOS clock signal transistor 252, a first MOS clock pull-down transistor 254, a second MOS clock signal transistor 256 and a second MOS clock pull-down transistor 258.

The first inverter, 248, comprises a first pull-up inverter transistor 260 and a first pull-down inverter transistor 262. It should be understood that the first inverter 248 is responsive to the clock signal for generating a first timing signal $\phi_A$ which is complimentary to the clock signal $\phi_o$ and the first timing signal $\phi_A$ being coupled to the source and drain of the first NMOS capacitor 240 of the voltage generating circuit 216 to provide timing signal for voltage generation.

The second inverter 250 comprises a second pull-up inverter transistor 264 and a second pull-down inverter transistor 266. The second inverter 250 is responsive to the first timing signal $\phi_A$ for generating a second timing signal $\phi'_A$ which is complimentary to the first timing signal and the second timing signal $\phi'_A$ being coupled to the source and drain of the second NMOS capacitor 242 of the voltage generating circuit 216 to provide timing signals for generation.

In the present embodiment, the first PMOS pull-up inverter transistor 260 has a channel width to channel length ratio (W/L) of 5 to 1 (5/1) and the first NMOS pull-down inverter transistor 262 has W/L of 20/1. The second PMOS pull-up inverter transistor 264 has a W/L of 5/1. The second NMOS pull-down inverter transistor 266 has a W/L of 20/1.

As explained earlier, one aspect of the present invention is to couple the p-well of each NMOS capacitor to form one plate of the NMOS capacitor thereby increasing the effective area of the capacitors so formed, resulting in an increase in capacitance which is independent of the operation states of the capacitors. Due to the increase in capacitance there is a more efficient charge pumping effect which then allows the charge pump to operate with a low voltage power supply. Here the first MOS clock signal transistor 252 has its gate coupled to its drain, its drain also coupled to the output of the first inverter 248 and its source coupled to the p-type well of the first NMOS capacitor 240 and the p-type well of the third NMOS pump capacitor 244. The first MOS clock pull-down transistor 254 has its drain coupled to the source of the first MOS clock signal transistor 252, its gate coupled to the third input terminal 214 and its source coupled to the lower supply voltage VSS.

The second MOS clock signal transistor 256 has its gate coupled to its drain, its drain also coupled to the output of the second inverter 250 and its source coupled to the p-type well of the second NMOS capacitor 242 and the p-type well of the fourth NMOS capacitor 246. The second MOS clock pull-down transistor 240 has its drain coupled to the source of the second MOS clock signal transistor 256, its gate coupled to the output of the first inverter 248 and its source coupled to the lower supply voltage VSS.

The voltage limiter circuit 220 comprises a first MOS limiter transistor 268, a second MOS limiter transistor 270, a third MOS limiter transistor 272 and a fourth MOS limiter transistor 274. The first MOS limiter transistor 268, has its drain coupled to the drain of the fifth MOS transistor diode 238 of the voltage generating circuit 216 and its drain also coupled to its gate. The second MOS limiter transistor 270 has its drain coupled to its gate and its drain also coupled to the source of the first MOS limiter transistor 268. The third MOS limiter transistor 272 has its drain coupled to its gate and its gate also coupled to the source of the second MOS limiter transistor 270. The fourth MOS limiter transistor 274 has its drain coupled to its gate, its drain also coupled to the source of the third MOS limiter transistor 272 and its source coupled to the lower supply voltage VSS. On this circuit, first MOS limiter transistor 268 has a W/L of 20/1.4, and the second and third limiter transistors 270, and 272 have W/L of 60/1.4. Fourth limiter transistor 274 has a W/L of 60/1. The lengths of these devices were adjusted so the maximum voltage at the drain of the fifth MOS transistor diode 238 will not exceed 7.0 volts.

The output voltage regulator circuit 222 comprises a first MOS clamp transistor 276, a second MOS clamp transistor 278, a third MOS clamp transistor 280 and a clamp resistor 282. The first MOS clamp transistor 276 has its drain coupled to its gate, its gate coupled to the upper supply voltage VDD and its source coupled to the source of the MOS transistor diode 238. The second MOS clamp transistor 278 has its drain coupled to its gate, its gate coupled to source of the MOS transistor diode 238 and its source coupled to the upper supply voltage VDD. The clamp resistor 282 having a first terminal and a second terminal. The first terminal of the clamp resistor 282 being coupled to the source of the MOS transistor diode 238 and the second terminal of the clamp resistor 282 being coupled to the fourth terminal 224. The third MOS clamp transistor 280 has its drain coupled to its gate, its gate coupled to the fourth terminal 224 and its source coupled to the upper supply voltage VDD. The fourth terminal 224 is coupled to the voltage regulator circuit 222 for providing the final output voltage $V_{out}$.

The filtering circuit 226 is a MOS capacitor 284. The MOS capacitor transistor 284 has its gate coupled to the second terminal of the clamp resistor 282 and the fourth terminal 224, its drain coupled to its source and its source coupled to the lower supply voltage VSS. The MOS capacitor 284 works in conjunction with the clamp resistor 282 to act as a resistor-capacitor pair for providing filtering effect to reduce the variation in the final output voltage $V_{out}$.

Operation of the voltage generating circuit is similar to that of a prior art charge pump described in FIG. 1A and 1B above. Initially, the source of first MOS transistor diode 230 is at VDD, less its threshold voltage. The first timing signal $\phi_A$ and the second timing signal $\phi'_A$ have voltage waveforms as shown in FIG. 1B. After each pulse of the first timing signal $\phi_A$ at the source-drain of first NMOS capacitor 240 and third NMOS capacitor 244, and similarly, after each pulse of the second timings signal $\phi'_A$ at the source-drain of second NMOS capacitor 242 and fourth NMOS capacitor 246 as previously described in conjunction with FIG. 1A, an increase in voltage results at the source of each of the MOS transistor diodes 230, 232, 234, 236 and 238.

The Output voltage regulator circuit 222 is responsible for regulating the final output voltage $V_{out}$ to between VDD minus $V_T$ to VDD plus $V_T$. First MOS clamp transistor 276 keeps the final output voltage at VDD−$V_T$ if the clock stops. It also initializes the final output voltage $V_{out}$ to VDD−$V_T$ before the clock starts. The second MOS clamp transistor 278 will be turned on if the voltage at the source of the MOS transistor diode 238 goes higher than VDD plus $V_T$. The clamp resistor 282 and the third MOS clamp transistor 280 provide further clamping and filtering so that there is little ripple at the final output voltage $V_{out}$.

The voltage limiter circuit 220 is coupled to the lower supply voltage VSS and the output voltage generating circuit 216 for limiting the maximum output voltage at any node within the voltage generating circuit to less than 7.0 Volts in case VDD is connected to a 5.0±0.5 volts power supply by accident. This serves to prevent any damages to the circuit due to accidental high voltage stress. Voltage limiter circuit 220 comprises four MOS limiter transistors, each being coupled to function as a diode. When the voltage at the drain of the fifth MOS transistor 238 of the voltage generating circuit 216 is above four times the $V_T$ of the MOS limiter transistors, current will flow to VSS and the voltage at the drain of the fifth MOS transistor 238 will be clamped to less than or equal to 7.0 volts. The voltage limiter circuit 220 will serve to protect the circuitry in case a customer plugs a 3.3 volt product into a 5.0±0.5 volts supply. If that happens, the voltage limiter circuit will limit the maximum voltage to less than or equal to 7.0 volts, thereby minimizing possible damage to the integrated circuit due to excessive voltage.

As stated, another aspect of the present invention to provide a low voltage charge pump which includes MOS capacitors formed of MOS devices, whereby the p-well of each capacitor is driven from a lower supply voltage to one threshold voltage less than the upper supply voltage for avoiding possible degradation of circuit due to forward biasing of p-wells and n-type substrates of the MOS devices. Such a forward biasing problem occurs when the voltage of the p-well is 0.7 volt higher than the n-substrate which results in a forward biasing of the p-well and the n-substrate in the form of a forward-biased p-n junction, leading to excessive current flow between the two. Such excessive current may cause damage to the integrated circuit.

In the present embodiment, the source and drain of the first NMOS capacitor 240 and the third NMOS capacitor 244 are driven by the first timing signal $\phi_A$ from VSS to VDD. Similarly, the source and drain of the second NMOS capacitor 242 and the fourth NMOS capacitor 246 are driven by the second timing signal $\phi'_A$ from VSS to VDD. The p-wells of the first NMOS capacitor 240 and third NMOS capacitor 244 are driven by the third timing signal $\phi_B$ which is in phase with the first timing signal $\phi_A$. Similarly, the p-wells of the second NMOS capacitor 242 and third NMOS capacitor 246 are driven by the fourth timing signal $\phi'_B$ which is in phase with the second timing signal $\phi'_A$. However, the third timing signal $\phi_B$ and the fourth timing signal $\phi'_B$ are at one $V_T$ below the first timing signal $\phi_A$ and the second timing signal $\phi'_A$ respectively. In other words, the maximum voltage the p-wells will see is one $V_T$ less than what the source and drain will see. By controlling the maximum voltage to the p-well at one $V_T$ below that of the source and drain at all times, the chance of forward biasing between the p-well and the n-substrate is minimized. Simulations have shown that, in the worst case process and at low temperature, p-well coupling according to the present invention is necessary in order to get an output voltage higher than VDD when VDD is 3.0 volts.

Both the first inverter 248 and second inverter 250 of the timing circuit have large fanout to the NMOS capacitors. Each of the NMOS capacitor has a W/L of 90/40. Each of the NMOS capacitors is driven by a PMOS pull-up inverter transistor with W/L of 5/1 in either the first inverter 248 or the second inverter 250. This results in a slow rise time. The slowness of the clock rise time does not hurt the maximum voltage attainable. The slow rise time is intended to allow the voltage limiter circuit 220 sufficient time to limit the peak voltage to about four times $V_T$. The amount which the limiter node exceeds four times $V_T$ is determined by the rise time of the clock, the W/L of the NMOS capacitors, and the W/L of the NMOS limiter transistors. If the W/L of the MOS limiter transistors are too large, their parasitic capacitance will ruin the efficiency of the charge pump. The W/L of the limiter transistors are designed to be small enough so that the pump efficiency is usable and the W/L of the pull-up inverter transistors are designed to be slow enough so that voltage limiter circuit is effective at keeping the voltage below 7.0 volts. If the pull-up inverter transistors with W/L of 5/1 are replaced with ones having W/L of 50/1, the 7.0 volt limit will be exceeded in spite of the limiter circuit.

The filtering circuit 226 is coupled to the final output terminal 224 to provide filtering effect for reducing the variation in the final output voltage $V_{out}$.

Simulation showed that the above preferred embodiment constructed in accordance with the present invention worked well in providing a higher output voltage when the supply voltage VDD is as low as 2.0 volts. In comparison, the prior art charge pump with the p-wells grounded failed when VDD fell to around 3.0 volts.

From the foregoing detailed description, it can thus be seen that the present invention provides an improved low voltage charge pump that addresses the major drawback in the prior art charge pump of not being able to provide a high voltage output with MOS capacitors due to significant reduction of the effective capacitance of such MOS capacitors when operate under low voltage power supply condition.

Although the present invention has been described in accordance embodiments shown in the figures, one of ordinary skill in the art recognizes there could be variations to the embodiments and those variations would be within the spirit and scope of the present invention. Accordingly, many modifications may be made by one of ordinary skill in the art without departing from the spirit and scope of the appended claims.

What is claimed is:

1. A low voltage charge pump for receiving a clock signal, a first supply voltage and a second supply voltage, comprising:

voltage generating means for receiving the first supply voltage and for generating an output voltage which is at a first predetermined voltage above the first supply voltage, the voltage generating means including a plurality of MOS devices, each MOS device being coupled as capacitor, each of the capacitor including a p-well, each p-well receiving one of a plurality of timing signals and acting as a plate of the respective capacitor; and timing signals means for receiving the clock signal and the second supply voltage and for providing the plurality of timing signals to the voltage generating means.

2. A low voltage charge pump as claimed in claim 1, wherein the plurality of timing signals coupled to the p-well of each of the capacitor have a range of the value of the second supply voltage to one threshold voltage below the value of the first supply voltage.

3. A low voltage charge pump as claimed in claim 1, wherein the voltage generating means further comprises an input for receiving the first supply voltage, an output for providing the output voltage and a plurality of control terminals.

4. A low voltage charge pump as claimed in claim 3, wherein the timing signals means comprises an input for receiving the clock signal and a plurality of outputs, the plurality of outputs of the timing signals means being coupled to the plurality of control terminals of the voltage generating means for controlling the first predetermined voltage.

5. A low voltage charge pump as claimed in claim 4, wherein the timing signals means further comprises:

a first inverter having an input and an output;
a second inverter having an input and an output;
the first inverter responsive to the clock signal for generating a first timing signal which is complementary to the clock signal and the first timing signal being coupled to one of the plurality of control terminals of the voltage generating means to provide timing signals for voltage generation;

the second inverter responsive to the first timing signal for generating a second timing signal which is complementary to the first timing signal and the second timing signal being coupled to the other one of the plurality of control terminals of the voltage generating means to provide timing signals for voltage generation;

a first MOS clock signal transistor responsive to the first timing signal for providing a third timing signal which is one threshold voltage below the first timing signal, the first MOS clock signal transistor has its gate coupled to its drain and its drain coupled to the output of the first inverter;

a first MOS clock pull-down transistor responsive to the clock signal, the first MOS clock pull-down transistor has its drain coupled to the source of the first MOS clock signal transistor, its gate coupled to the clock signal and its source coupled to the second supply voltage;

a second MOS clock signal transistor responsive to the second timing signal for providing a fourth timing signal which is one threshold voltage below the second timing signal, the second MOS clock signal transistor has its gate coupled to its drain and its drain coupled to the output of the second inverter; and a second MOS clock pull-down transistor responsive to the first timing signal, the second MOS clock pull-down transistor has its drain coupled to the source of the second MOS clock signal transistor, its gate coupled to the output of the first inverter and its source coupled to the second supply voltage.

6. A low voltage charge pump as claimed in claim 1, further comprises:

voltage limiter means coupled to the second supply voltage and the voltage generating means for limiting the maximum voltage of the output voltage of the voltage generator means to below a second predetermined voltage.

7. A low voltage charge pump as claimed in claim 1, further comprises:

a voltage regulator means for regulating the first predetermined voltage, thereby providing a final output voltage which is within a predetermined range, the voltage regulator means having an input, an output and a supply terminal, the voltage regulator means has its input coupled to the output of the voltage generating means and its supply terminal coupled to the first supply voltage.

8. A low voltage charge pump for receiving a clock signal, an upper supply voltage and a lower supply voltage, comprising:

a voltage generating circuit for generating an output voltage which is at a first predetermined voltage above the upper supply voltage, the voltage generating circuit having an input for receiving the upper supply voltage, a plurality of control terminals and a plurality of MOS devices, each MOS device being coupled as capacitor, each of the capacitor including a p-well, the p-well acting as a plate of the respective capacitor; and a timing signals circuit for receiving the clock signal and the lower supply voltage and for providing timing signals to the Voltage generating circuit so that each of the p-well of the capacitors is driven from the lower supply voltage to one threshold voltage below the upper supply voltage, the timing signals circuit having an input for receiving the clock signal and a plurality of outputs, the plurality of outputs of the timing signals circuit being coupled to the plurality of control terminals of the Voltage generating circuit for controlling the first predetermined voltage.

9. A low voltage charge pump as claimed in claim 8, wherein the timing signals means further comprises:

a first inverter having an input and an output;

a second inverter having an input and an output;

the first inverter responsive to the clock signal for generating a first timing signal which is complementary to the clock signal and the first timing signal being coupled to one of the plurality of control terminals of the voltage generating circuit to provide timing signals for voltage generation;

the second inverter responsive to the first timing signal for generating a second timing signal which is complementary to the first timing signal and the second timing signal being coupled to the other one of the plurality of control terminals of the voltage generating means to provide timing signals for voltage generation;

a first MOS clock signal transistor responsive to the first timing signal for providing a third timing signal which is one threshold voltage below the first timing signal, the first MOS clock signal transistor has its gate coupled to its drain and its drain coupled to the output of the first inverter;

a first MOS clock pull-down transistor responsive to the clock signal, the first MOS clock pall-down transistor has its drain coupled to the source of the first MOS clock signal transistor, its gate coupled to the clock signal and its source coupled to the lower supply voltage;

a second MOS clock signal transistor responsive to the second timing signal for providing a fourth timing signal which is one threshold voltage below the second timing signal, the second MOS clock signal transistor has its gate coupled to its drain and its drain coupled to the output of the second inverter; and a second MOS clock pull-down transistor responsive to the first timing signal, the second MOS clock pull-down transistor has its drain coupled to the source of the second MOS clock signal transistor, its gate coupled to the output of the first inverter and its source coupled to the lower supply voltage.

10. A low voltage charge pump as claimed in claim 8, further comprises:

voltage limiter means coupled to the lower supply voltage and the voltage generating means for limiting the maximum voltage of the output voltage of the voltage generator circuit to below a second predetermined voltage.

11. A low voltage charge pump as claimed in claim 8, further comprises:

a voltage regulator circuit for regulating the first predetermined voltage, thereby providing a final output voltage which is within a predetermined range; the voltage regulator circuit having an input, an output and a supply terminal, the voltage regulator circuit has its input coupled to the output of the voltage generating circuit and its supply terminal coupled to the upper supply voltage.

12. A low voltage charge pump for receiving a clock signal, an upper supply voltage and a lower supply voltage, comprising:

a voltage generating circuit for generating an output voltage which is at a first predetermined voltage above the upper supply voltage, the voltage generating circuit having an input for receiving the upper supply voltage, a plurality of control terminals and a plurality of MOS devices, each MOS device being coupled as capacitor, each of the capacitor including a p-well, the p-well acting as a plate of the respective capacitor; and a timing signals circuit for receiving the clock signal and the lower supply voltage and for providing timing signals to the voltage generating circuit so that each of the p-well of the capacitors is driven from the lower supply voltage to one threshold voltage below the upper supply voltage, the timing signals circuit having an input for receiving the clock signal and a plurality of outputs, the plurality of outputs of the timing signals circuit being coupled to the plurality of control terminals of the voltage generating circuit for controlling the first predetermined voltage; and a voltage limiter circuit coupled to the lower supply voltage and the voltage generating circuit for limiting the maximum voltage of the output voltage of the voltage generating circuit to below a second predetermined voltage.

13. A low voltage charge pump as claimed in claim 12, further comprises a voltage regulator circuit for regulating a final output voltage to within a predetermined range, the voltage regulator circuit having an input, an output and a supply terminal, the voltage regulator circuit has its input coupled to the output of the voltage generating circuit and its supply terminal coupled to the upper supply voltage.

14. A low voltage charge pump for receiving a clock signal, an upper supply voltage and a lower supply voltage and for generating a final output voltage, comprising:

a first terminal for receiving the upper supply voltage;

a second terminal for receiving the lower supply voltage;

a third terminal for receiving the clock signal;

a fourth terminal;

a voltage generating circuit for generating a voltage which is at a first predetermined voltage above the upper supply voltage, the voltage generating circuit having an input, an output, and a plurality of control terminals, the input of the voltage generating circuit being coupled to the first terminal for receiving the upper supply voltage, the first predetermined voltage is one threshold voltage of an NMOS transistor, wherein the voltage generating circuit further comprises:

a first MOS transistor diode the first MOS transistor diode having its drain coupled to its gate and its gate coupled to the input of the voltage generating circuit;

a second MOS transistor diode, the second MOS transistor diode having its drain coupled to its gate and its gate coupled to the source of the first MOS transistor diode;

a third MOS transistor diode, the third MOS transistor diode having its drain coupled to its gate and its gate coupled to the source of the second MOS transistor diode;

a fourth MOS transistor diode, the fourth MOS transistor diode having its drain coupled to its gate, and its gate coupled to the source of the third MOS transistor diode and its source coupled to the limiter node;

a fifth MOS transistor diode, the MOS transistor diode having its drain coupled to its gate, its gate coupled to the source of the fourth MOS transistor diode and its source coupled to the output of the voltage generating circuit;

a first capacitor having a first control terminal coupled to a p-type well formed on the first capacitor, the first capacitor having its gate coupled to the source of the first MOS transistor diode, and its source coupled to its drain;

a second capacitor having a second control terminal coupled to a p-type well formed on the second capacitor, the second capacitor having its gate coupled to the source of the second MOS transistor diode, and its source coupled to its drain;

a third capacitor having a third control terminal coupled to a p-type well formed on the third capacitor, the third capacitor having its gate coupled to the source of the third MOS transistor diode, and its source coupled to its drain;

a fourth capacitor having a fourth control terminal coupled to a p-type well formed on the fourth capacitor, the fourth capacitor having its gate coupled to the source of the fourth MOS transistor diode, its source coupled to its drain;

a timing signals circuit for providing timing signals to the voltage generating circuit, the timing signals circuit having an input and a plurality of outputs, the input of the timing signals circuit being coupled to the third terminal for receiving the clock signal, the plurality of outputs of the timing signals circuit being coupled to the plurality of control terminals of the voltage generating circuit for controlling the first predetermined voltage; wherein the timing signals circuit further comprises:

a first inverter having an input and an output, the first inverter further comprises a first PMOS pull-up inverter transistor and a first NMOS pull-down inverter transistor, the first inverter responsive to the clock signal for generating a first timing signal which is complementary to the clock signal and the first timing signal being coupled to the drain of the first capacitor of the voltage generating circuit to provide timing signals for voltage generation;

a second inverter having an input and an output, the second NMOS inverter further comprises a second PMOS pull-up inverter transistor and a second NMOS pull-down inverter transistor, the second inverter responsive to the first timing signal for generating a second timing signal which is complementary to the first timing signal and the second timing signal being coupled to the drain of the second capacitor of the voltage generating circuit to provide timing signals for voltage generation;

a first MOS clock signal transistor responsive to the first timing signal for providing a third timing signal which is one threshold voltage below the first timing signal, the first MOS clock signal transistor having its gate coupled to its drain, its drain also coupled to the output of the first inverter and its source coupled to the p-type well of the first NMOS transistor diode and the p-type well of the third NMOS transistor diode;

a first MOS clock pull-down transistor responsive to the clock signal, the first MOS clock pull-down transistor having its drain coupled to the source of the first MOS clock signal transistor, its gate coupled to the third input terminal and its source coupled to the lower supply voltage;

a second MOS clock signal transistor responsive to the second timing signal for providing a fourth timing signal which is one threshold voltage below the second timing signal, the second MOS clock signal transistor having its gate coupled to its drain; its drain also coupled to the output of the second inverter and its source coupled to the p-type well of the second NMOS transistor diode and the p-type well of the fourth NMOS transistor diode;

a second MOS clock pull-down transistor responsive to the first timing signal, the second MOS clock pull-down transistor having its drain coupled to the source of the second MOS clock signal transistor, its gate coupled to the output of the first inverter and its source coupled to the lower supply voltage;

a voltage limiter circuit coupled to the lower supply voltage and the output of the voltage generating circuit for limiting the voltage at the drain of the fifth MOS transistor diode to below 7.0 volts, wherein the regulator circuit further comprises:

a first MOS limiter transistor, the first MOS limiter transistor having its drain coupled to the output of the drain of the fifth MOS transistor diode and its drain also coupled to its gate;

a second MOS limiter transistor, the second MOS limiter transistor having its drain coupled to its gate and its drain also coupled to the source of the first MOS limiter transistor;

a third MOS limiter transistor, the third MOS limiter transistor having its drain coupled to its gate and its drain also coupled to the source of the second MOS limiter transistor;

a fourth MOS limiter transistor, the fourth MOS limiter transistor having its drain coupled to its gate, its drain also coupled to the source of the third MOS limiter transistor and its source coupled to the lower supply voltage; and a voltage regulator circuit for regulating the final output voltage to the predetermined voltage, the voltage limiting circuit having an input, an output and a supply terminal, the voltage limiting circuit having its input coupled to the predetermined voltage receiving circuit and its supply terminal coupled to the upper supply voltage, wherein the voltage limiting circuit further comprises:

a first NMOS clamp transistor having its drain coupled to its gate, its gate coupled to the upper supply voltage and its source coupled to the output of the voltage generator;

a second NMOS clamp transistor having its drain coupled to its gate, its gate coupled to the output of the voltage generator and its source coupled to the upper supply voltage;

a clamp resistor having a first terminal and a second terminal, the first terminal of the clamp resistor being coupled to the output of the voltage generator, the second terminal of the clamp resistor being coupled to the fourth terminal for providing a final output voltage; and a third NMOS Clamp transistor having its drain coupled to its gate, its gate coupled to the fourth terminal and its source coupled to the upper supply voltage.

* * * * *